United States Patent [19]

Lardellier

[11] Patent Number: 5,105,618
[45] Date of Patent: Apr. 21, 1992

[54] COUNTERROTATING FAN ENGINE

[75] Inventor: Alain M. J. Lardellier, Melun, France

[73] Assignee: Societe Nationale D'Etude Et De Construction De Moteurs D'Aviation "S.N.E.C.M.A.", Paris, France

[21] Appl. No.: 514,250

[22] Filed: Apr. 25, 1990

[30] Foreign Application Priority Data

Apr. 26, 1989 [FR] France ............... 89 05516

[51] Int. Cl.$^5$ ............... F02K 3/00
[52] U.S. Cl. ............... 60/226.1; 60/268
[58] Field of Search ............... 60/226.1, 268, 39.162

[56] References Cited

U.S. PATENT DOCUMENTS

| 2,430,399 | 11/1947 | Heppner | 60/35.6 |
| 2,504,181 | 4/1950 | Constant | 60/226.1 |
| 4,055,041 | 10/1977 | Adamson et al. | 244/54 |
| 4,147,029 | 4/1979 | Sangisson | 244/54 |
| 4,506,850 | 3/1985 | McConnell | 244/54 |
| 4,548,546 | 10/1985 | Lardellier | 415/133 |
| 4,646,810 | 3/1987 | Lardellier | 415/200 |
| 4,790,133 | 12/1988 | Stuart | 60/39.162 |

FOREIGN PATENT DOCUMENTS

| 244515 | 11/1987 | European Pat. Off. . |
| 1233210 | 8/1967 | Fed. Rep. of Germany . |
| 25353945 | 5/1984 | France . |
| 2560642 | 9/1985 | France . |
| 2606081 | 5/1988 | France . |
| 585342 | 2/1947 | United Kingdom . |
| 586554 | 3/1947 | United Kingdom . |
| 603283 | 6/1948 | United Kingdom . |

Primary Examiner—Richard A. Bertsch
Assistant Examiner—Howard R. Richman
Attorney, Agent, or Firm—Oblon, Spivak, McClelland, Maier & Neustadt

[57] ABSTRACT

A gas turbine engine with counterrotating fans placed upstream from the engine so that gas circulates from upstream to downstream at the level of a LP compressor (1), then from downstream to upstream in a HP compressor (5), chamber an (6) and HP and LP turbines (7 and 8), then again downstream in first and second turbines (10, 11) before being expelled into the cold airflow coming from first and second fans (14, 15).

9 Claims, 2 Drawing Sheets

COUNTERROTATING FAN ENGINE

BACKGROUND OF THE INVENTION

1. Field of the Invention

This invention relates to a gas turbine engine, intended for aircraft propulsion, of the type comprising a gas generator which feeds two overlapped counterrotating slow-power turbines.

2. Discussion of the Background

FR-A-2 535 394 describes a gas turbine engine of this type in which the power turbines are placed downstream from the gas generator and are driven directly by the hot gases exiting said generator. Said turbines drive directly, without a reduction gear, either two stages of counterrotating propellers or two stages of ducted fans by which the propulsion is assured. Two mounting solutions are proposed. One provides for placing the propellers or the fans behind the engine, which presents drawbacks and difficulties during mounting under the wings of an aircraft. The other provides for placing them in front of the engine, which, for driving, calls for connection shafts of great length whose installation also comprises drawbacks.

FR-A-2 560 642 describes a gas turbine engine of the same type in which a counterrotating supercharging compressor is associated with counterrotating front fans. A device for adjusting the pitch of the blades of a fan stage is added, making it possible to obtain reversal of the flow.

FR-A-2 606 081 in the name of the applicant describes another solution for the same type of engine comprising a gas generator in which the gases circulate from the rear to the front relative to the direction of movement of the aircraft and feed, after a reversal of direction, two counterrotating power turbines directly driving two stages of counterrotating propellers. The gas generator is fed by an air intake duct consisting of a multiplicity of ducts placed circumferentially around the cowl of the engine, and the exhaust of gases at the outlet of the power turbines is performed by a multiplicity of ducts interposed between the intake ducts.

If this solution makes it possible to produce a traction-type counterrotating fan engine with a cantilever in front of the aircraft wing which is smaller than the prior solutions made possible, the fact nonetheless remains that the production of the air intake duct and the flow outlets downstream from the slow turbines are fairly complicated to achieve.

SUMMARY OF THE INVENTION

This invention has as its object to produce a fan engine of the preceding one (with reversal of flow direction) which makes possible a front air intake in the low-pressure compressor of the gas generator.

The invention also has as its object to produce a fan engine that is more compact than the preceding ones and is of simpler design, with easier mounting and comprising, in particular, turbine shafts of smaller length, therefore being less sensitive to vibrations.

The invention also has as its object making it possible to allow for the production of a power plant, which by its greater simplicity will be lighter than the engines of the current art while having the advantages of counterrotating fan solutions in matters of specific consumption.

The invention therefore applies to a gas turbine engine intended for aircraft propulsion, of the type comprising a gas generator which feeds two overlapped counterrotating slow turbines, themselves driving two counterrotating fans of a traction-type, placed upstream from the engine, said gas generator comprising a low-pressure compressor followed by a high-pressure compressor feeding the compressed air to a combustion chamber in which the air is vaporized and burned to provide energy to a high-pressure turbine followed by a low-pressure turbine and two slow turbines.

According to the invention, the gases circulate from upstream to downstream at the level of the low-pressure compressor, then from downstream to upstream in the high-pressure compressor, the chamber and the HP and LP turbines, and then again from upstream to downstream in the free turbines before being expelled into the cold flow coming from the counterrotating fans.

According to a characteristic of the invention, the low-pressure compressor consists of two units of counterrotating rotor stages, a first unit being carried by a central turbine shaft, and driven by the low-pressure turbine of the gas generator while the second unit of rotor stages is integral with the upstream fan, said second rotor unit of LP compressor and said upstream fan being connected by a drum to the first, radially internal, slow turbine that drives them in rotation.

Thus, the low-pressure compressor and the fans comprise a front air intake.

BRIEF DESCRIPTION OF THE DRAWINGS

Other characteristics of the engine according to the invention and its detailed description will be indicated later taking into account the accompanying sheets of which.

DESCRIPTION OF THE PREFERRED EMBODIMENT

Figure 1:
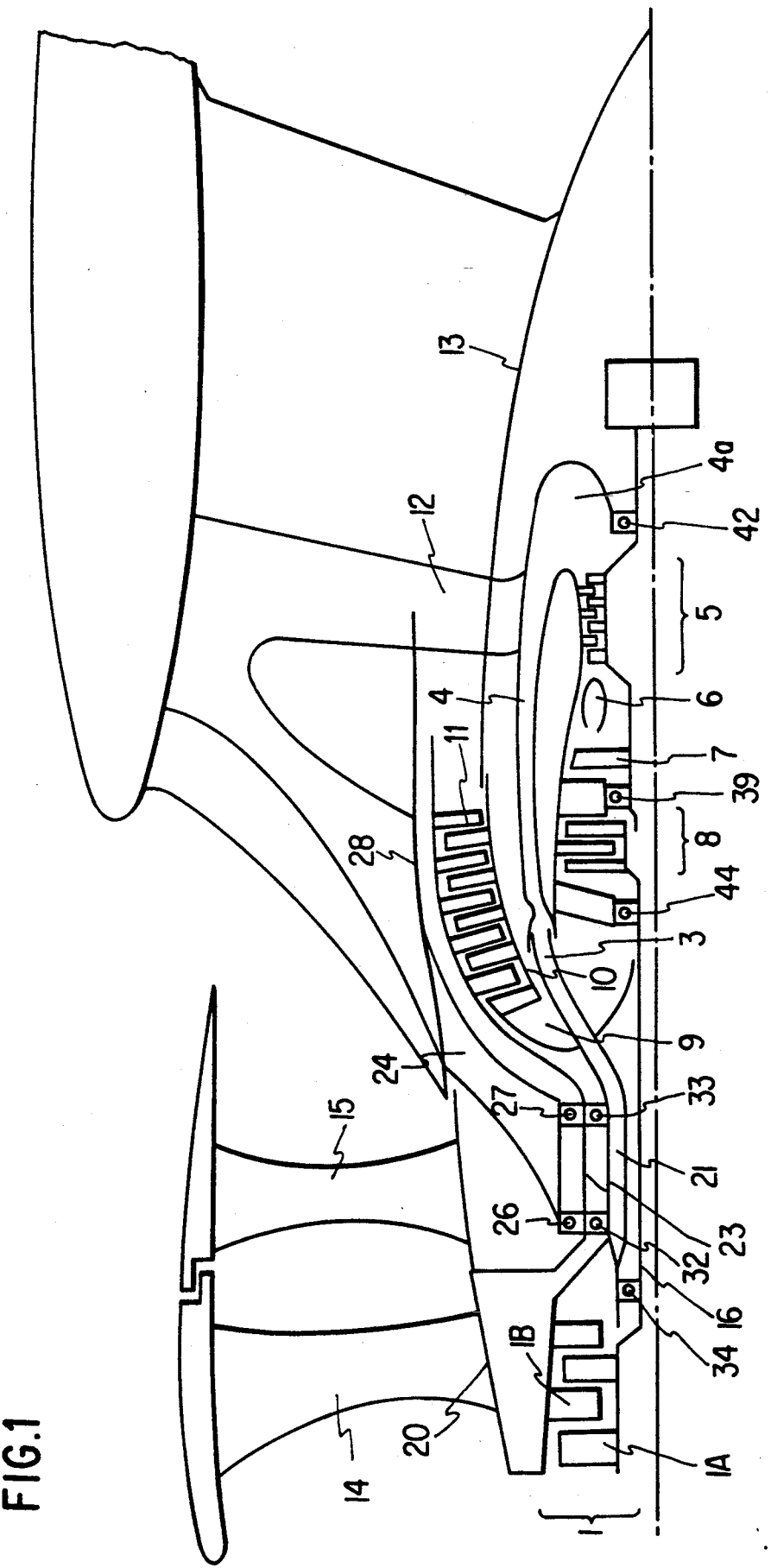
FIG. 1 is a simplified longitudinal half-section view of the embodiment of the engine according to the invention.

In FIG. 1, the compressors and turbines are diagrammed without the number of stages shown for each one being characteristic of the actual structure of the engine. Thus, the LP compressor is simplified here in two stages while the actual mode can comprise five of them.

The engine will now be described below taking into account the two accompanying figures.

Overall, the gas generator comprises a low-pressure (LP) axial compressor 1 with a front air intake 2 followed by an annular duct comprising an upstream part 3, mobile in rotation, and a stationary downstream part 4 in which the compressed air circulates from upstream to downstream. At its downstream end, stationary downstream duct 4 comprises a bend 4a after which the flow changes direction to enter into high-pressure compressor 5 then into combustion chamber 6, where the compressed air is vaporized, the combustion gases being expanded in high-pressure (HP) turbine 7 then in low-pressure (LP) turbine 8.

In entire high-pressure (HP) body 5, 6, 7, 8, the flow circulates from the rear to the front of the engine; at the outlet of the low-pressure turbine, the flow changes direction again in a bent rotating structure 9 and penetrates from the front to the rear in two counterrotating free turbines, one turbine being 10 radially internal and the other turbine 11 being radially external, and axially overlapped with turbine 10.

At the outlet of slow turbines 10 and 11, the flow is expelled downstream in an exhaust plane 12 located longitudinally at the level of high-pressure compressor 5 and forms an annular outlet around a stationary rear central body 13.

The turbines 10 and 11, each with five stages (this being only one example) respectively drive an upstream fan 14 and a downstream fan 15 located upstream of the engine, the first, 14, at the level of LP compressor 1, which it surrounds, while the second, 15, is placed at a longitudinal level located between LP compressor 1 and bent rotating structure 9.

LP compressor 1 is formed from two counterrotating rotor stage units 1A, 1B. First rotor unit 1A is radially internal in unit 1B, and it is carried by a central turbine shaft 16 and driven by low-pressure turbine 8 of the gas generator.

Second rotor unit 1B of the LP compressor 1 is integral with upstream fan 14 and first radially internal slow turbine 10 which rotatably drives them.

To do this, stages 1B of the compressor are carried by a ring 17 bolted upstream by bolt 18 to upstream nose 19 integral with disk 20 of upstream fan 14.

The portion of ring 17 is connected to turbine 10 by a drum 21. The latter comprises an inner wall 21a of an approximately tubular shape connected by radial partition walls 21b to an outer wall 21c which surrounds it to form, downstream from the low-pressure compressor, a duct for the compressed air coming from LP compressor 1 which is able to direct this air to HP compressor 5.

Thus, upstream fan 14, separation nose 19, external rotor unit 1B of LP compressor 1, and drum 21 form a common rotating unit with annular duct 3 and inner free turbine 10. The arrangement of rotating bearings will be indicated later.

Downstream fan 15 is connected by bolts 22 to a shaft 23 surrounding drum 21 of upstream fan 14, shaft 23 being integral downstream with second slow turbine 11 placed radially outside first slow turbine 10.

The stationary parts of the engine consist of an upstream stationary structure 24 comprising an inner ring 25 placed radially within the downstream fan and comprising two rotation bearings 26, 27 of downstream fan shaft 23. Structure 24 comprises radial stiffening arms supporting outer housing 28 of the engine, a housing which extends downstream from the downstream fan disk to exhaust plane 12 for exhausting gases outside the free turbines.

The stationary parts also comprise a rear central body 13 extending downstream from turbine 10 and radially comprising, from outside to inside, a ring forming a rear cone 29 for the evacuation of gases coming from fans 14, 15 and slow turbines 10, 11, a double ring 30, 31 provided with a downstream bend 4a and forming intermediate upstream-downstream duct 4 between rotating drum 3 and high-pressure compressor 5; rear central body 13 contains the gas generator which comprises, from the rear to the front, HP compressor 5, combustion chamber 6 and HP turbine 7 and LP turbine 8, LP turbine 8 being connected by central LP turbine shaft 16 to first rotor unit 1A of LP compressor 1.

Drum 21 of upstream fan 14 is mounted to rotate, on one hand, inside downstream fan shaft 23 by the provision of two bearings 32, 33 placed between the shaft and outer wall 21c of the drum, and, on the other hand, on central shaft 16 of the LP turbine by an upstream bearing 34 placed between the central shaft and inner wall 21a of drum 21.

Detailing now the high-pressure body of the gas generator, it comprises, to the rear, HP compressor 5 connected by a central shaft 35 to HP turbine 7 placed upstream, and at the intake of HP compressor 5, it comprises a rear journal 36 extended downstream and provided with a gear 37 driving the pinions of an equipment support 38, said support being placed inside downstream cone 29.

The HP body is centered upstream on a bearing 39 placed between an upstream structural element 40 of central body 13 and an upstream journal 41 and downstream on a bearing 42 placed between a downstream structural element 43 of the central body and rear journal 36.

Figure 2:
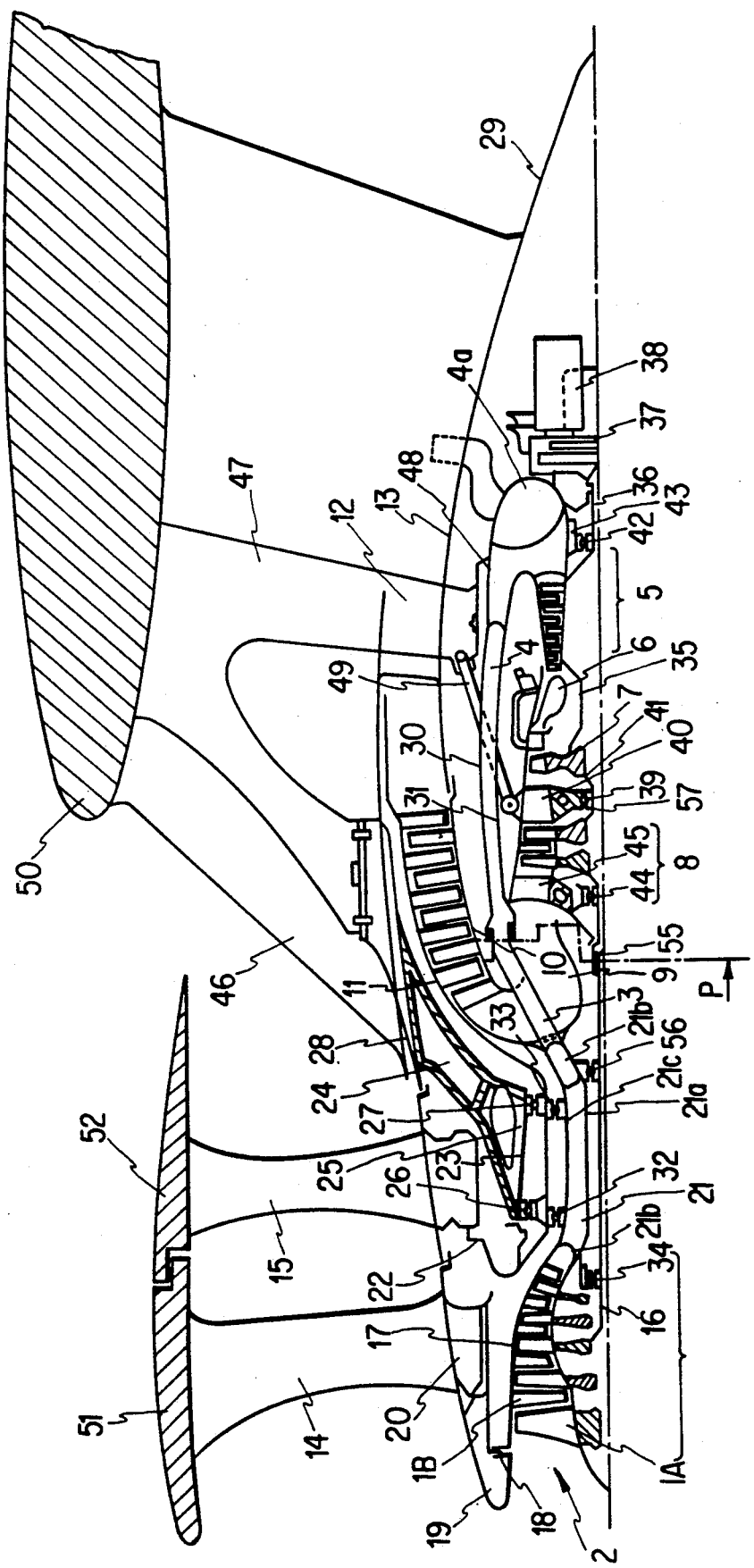
FIG. 2 is a longitudinal half-sectional view of an alternate embodiment of the engine according to FIG. 1.

LP turbine shaft 16 can be mounted to rotate, in front on bearing 34 already indicated carried internally by drum 21 of the upstream fan, and, behind, on a bearing 44 carried by a structural element 45 of central body 13. The variant shown in FIG. 2, making possible an easier disassembly with a sliding groove 55, consists of two parts, the upstream part of the shaft mounted on bearing 34 and a bearing 56 integral with drum 21 and the downstream part mounted on bearing 44 and bearing 57 integral with structure 45. In this case, the gas generator (i.e., LP HP turbine, chamber and HP compressor) can be separated easily from the upstream part (fans, LP compressor and free turbines) at the level of the labyrinths contained in plane P.

The engine is suspended with a double suspension strut 46, 47 hooked upstream on the radially external part of upstream stationary structure 24 and downstream on a reinforced part 48 cf ring 30, while stiffening arms 49 assure the holding of structural element 40.

Such an engine can be suspended with a relatively small cantilever under wing 50 of an aircraft so that fans 14 and 15 are placed upstream of the leading edge of the wing.

Preferably, fans 14, 15 comprise outer annular fairings 51, 52 delimiting the outer edge of the secondary flow. In this case, the trailing edge of fairing 52 of downstream fan 15 is located in a plane located upstream of the leading edge of wing 50 of the aircraft, and the engine is suspended at such a height that fairings 51, 52 of the fans are located under the lowest point of the lower surface of the wing of the aircraft.

In this embodiment type with ducted fans, the unit formed by fairing 51 or 52, the blades of fans 14 or 15 and the fan disk can constitute a unit consisting a single piece produced of a composite material. This is made possible by the fact that, for applications to engines with a very high bypass ratio, the peripheral speed of the hull is relatively low, on the order of 220 m/s, which allows the use of composite materials with the potential weight reduction resulting relative to the engines existing to date.

Obviously, numerous modifications and variations of the present invention are possible in light of the above teachings. It is therefore to be understood that within the scope of the appended claims, the invention may be practiced otherwise than as specifically described herein.

I claim:
1. A gas turbine engine for aircraft propulsion which comprises:

first and second counterrotating turbines which generate a flow and which in turn drive two counterrotating fans;

a gas generator for feeding said first and second turbines, the gas generator including a low-pressure compressor in communication with a high-pressure compressor for feeding compressed air to a combustion chamber and subsequently to a high-pressure turbine followed by a low-pressure turbine and the first and second turbines;

means for circulating gases from the gas generator from an upstream position to a downstream position at the level of the low-pressure compressor, then from a downstream position to an upstream position in the high-pressure compressor, the combustion chamber and the higher-pressure and low-pressure turbines, and then again from an upstream position to a downstream position in the first and second turbines before being expelled into the flow generated by the counterrotating fans;

said low-pressure compressor including first and second units of counterrotating rotor stages, said first rotor unit being carried by a central turbine shaft and driven by the low-pressure turbine of the gas generator, and the second rotor unit being integral with one of the counterrotating fans, the second rotor unit and said one of the counterrotating fans being connected to the first turbine so as to be rotably driven;

a drum having an inner wall of an approximately tubular form and connected by a plurality of radial partitions to a surrounding outer wall so as to form, downstream from the low-pressure compressor, a duct for the compressed air communicated from the low-pressure compressor which directs said air to the high pressure compressor; and an upstream stationary structure, bearing means, and a downstream fan shaft rotatably mounted inside said upstream stationary structure of the engine by said bearing means, said bearing means including two bearings, one upstream, the other downstream, placed between said downstream fan shaft and said stationary structure.

2. A gas turbine engine for aircraft propulsion which comprises:

first and second counterrotating turbines which generate a flow and which in turn drive two counterrotating fans;

a gas generator for feeding said first and second turbines, the gas generator including a low-pressure compressor in communication with a high-pressure compressor for feeding compressed air to a combustion chamber and subsequently to a high-pressure turbine followed by a low-pressure turbine and the first and second turbines;

means for circulating gases from the gas generator from an upstream position to a downstream position at the level of the low-pressure compressor, then from a downstream position to an upstream position in the high-pressure compressor, the combustion chamber and the higher-pressure and low-pressure turbines, and then again from an upstream position to a downstream position in the first and second turbines before being expelled into the flow generated by the counterrotating fans;

said low-pressure compressor including first and second units of counterrotating rotor stages, said first rotor unit being carried by a central turbine shaft and driven by the low-pressure turbine of the gas generator, and the second rotor unit being integral with one of the counterrotating fans, the second rotor unit and said one of the counterrotating fans being connected to the first turbine so as to be rotably driven;

a downstream fan connected to a shaft surrounding a drum of the upstream fan wherein said second turbine is located radially outside said first turbine and wherein said drum of the upstream fan is mounted for rotation, on one hand, inside the downstream fan shaft by bearing means located between the shaft and an outer wall of the drum, and, on the other hand, on a central shaft of the low-pressure turbine by upstream bearing means located between the central shaft and an inner wall of the drum.

3. A gas turbine engine for aircraft propulsion which comprises:

first and second counterrotating turbines which generate a flow and which in turn drive two counterrotating fans;

a gas generator for feeding said first and second turbines, the gas generator including a low-pressure compressor in communication with a high-pressure compressor for feeding compressed air to a combustion chamber and subsequently to a high-pressure turbine followed by a low-pressure turbine and the first and second turbines; and means for circulating gases from the gas generator from an upstream position to a downstream position at the level of the low-pressure compressor, then from a downstream position to an upstream position in the high-pressure compressor, the combustion chamber and the higher-pressure and low-pressure turbines, and then again from an upstream position to a downstream position in the first and second turbines before being expelled into the flow generated by the counterrotating fans;

said low-pressure compressor including first and second units of counterrotating rotor stages, said first rotor unit being carried by a central turbine shaft and driven by the low-pressure turbine of the gas generator, and the second rotor unit being integral with one of the counterrotating fans, the second rotor unit and said one of the counterrotating fans being connected to the first turbine so as to be rotably driven; and a rear central body which radially comprises, from an outer portion to an inner portion thereof, a ring forming a rear cone for evacuation of gases from the fans and the turbines, a double ring having a downstream bend and forming an intermediate upstream-downstream duct between a drum and the high-pressure compressor and containing the gas generator.

4. Engine according to claim 3, wherein, at the intake of the high-pressure compressor, a rear journal is positioned which extends downstream and includes a gear for driving pinions of an equipment support, said support being placed inside a downstream cone.

5. Engine according to claim 4, wherein the high-pressure body is centered upstream on a bearing located between an upstream structural element of the rear central body and an upstream journal, and downstream on a bearing located between a downstream structural element of the central body and the rear journal.

6. Engine according to claim 4, which comprises an outer ring for connecting the upstream stationary structure and the rear central body with one another via an outer ring and which are connected by a double suspension strut to a wing of an aircraft.

7. Engine according to claim 6 which comprises a cantilever member for suspending the engine under the wing and at lease one fan located upstream from the wing of the aircraft.

8. Engine according to claim 7, which comprises at least one ducted fan connected to the fans.

9. Engine according to claim 8, wherein the at least one fan comprises a fairing wherein a trailing edge portion of said fairing is located in a plane located upstream from a leading edge of the wing of the aircraft and wherein the engine is suspended at such a height that the fairing of the at least one fan is located under the lowest point of a lower surface of the wing of the aircraft.

* * * * *

UNITED STATES PATENT AND TRADEMARK OFFICE
CERTIFICATE OF CORRECTION

PATENT NO. : 5,105,618

DATED : April 21, 1992

INVENTOR(S) : Alain M. J. Lardellier

It is certified that error appears in the above-identified patent and that said Letters Patent is hereby corrected as shown below:

In the "ABSTRACT" on the title page:
 line 4, change "a" to --an--;
 line 5, before "chamber" insert --a--.

Column 2, line 34, change "section" to --sectional--.

Column 3, line 1, change "being 10" to --10 being--;
 line 27, before "portion" insert --downstream--.

Column 4, line 29, change "HP turbine," to --turbine, HP--.

Signed and Sealed this

Third Day of August, 1993

Attest:

MICHAEL K. KIRK

Attesting Officer   Acting Commissioner of Patents and Trademarks